(12) United States Patent
Lim et al.

(10) Patent No.: US 10,771,408 B2
(45) Date of Patent: Sep. 8, 2020

(54) CHATBOT SYSTEM AND SERVICE METHOD THEREOF

(71) Applicant: Electronics and Telecommunications Research Institute, Daejeon (KR)

(72) Inventors: Joon Ho Lim, Daejeon (KR); Hyun Ki Kim, Daejeon (KR); Min Ho Kim, Daejeon (KR); Ji Hee Ryu, Daejeon (KR); Kyung Man Bae, Daejeon (KR); Yong Jin Bae, Daejeon (KR); Ji Hyun Wang, Sejong-si (KR); Hyung Jik Lee, Daejeon (KR); Soo Jong Lim, Daejeon (KR); Myung Gil Jang, Daejeon (KR); Mi Ran Choi, Daejeon (KR); Jeong Heo, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 0 days.

(21) Appl. No.: 16/123,356

(22) Filed: Sep. 6, 2018

(65) Prior Publication Data
US 2019/0166071 A1    May 30, 2019

(30) Foreign Application Priority Data

Nov. 27, 2017  (KR) .......................... 10-2017-0159393

(51) Int. Cl.
*H04L 12/58*    (2006.01)
*G06F 16/332*   (2019.01)
(Continued)

(52) U.S. Cl.
CPC .......... *H04L 51/02* (2013.01); *G06F 16/3329* (2019.01); *G06F 40/30* (2020.01);
(Continued)

(58) Field of Classification Search
None
See application file for complete search history.

(56) References Cited

U.S. PATENT DOCUMENTS 8,185,380 B2 *  5/2012  Kameyama .......... G08G 1/0962
                                                     434/362
9,947,319 B1 *  4/2018  Horling ............... G10L 15/1815
(Continued)

FOREIGN PATENT DOCUMENTS

KR    10-2008-0075748    8/2008
KR    10-2009-0000442    1/2009
(Continued)

*Primary Examiner* — Marcus T Riley
(74) *Attorney, Agent, or Firm* — Kile Park Reed & Houtteman PLLC (57) ABSTRACT

A chatbot system and method conversing with other chatbots in place of a user. The chatbot system and method understand the purpose of conversation of a user, select chatbots to which the purpose of the user is to be transferred, converse with the selected chatbots in place of the user, and present the user with a result of conversation undertaken. The chatbot system converses with provider chatbots provided by property and service providers. The chatbot system includes a consumer chatbot that understands a purpose of conversation of a user, converses with the provider chatbots in place of the user, and provides a result of the conversation to the user.

11 Claims, 8 Drawing Sheets

(51) Int. Cl.
*G06Q 50/00* (2012.01)
*G06Q 10/10* (2012.01)
*G06F 40/30* (2020.01)
*G06F 40/35* (2020.01)

(52) U.S. Cl.
CPC ............ *G06F 40/35* (2020.01); *G06Q 10/10* (2013.01); *G06Q 50/00* (2013.01)

(56) References Cited

U.S. PATENT DOCUMENTS

| | | | | |
|---|---|---|---|---|
| 10,157,615 | B2* | 12/2018 | Horling | G10L 15/30 |
| 2006/0122837 | A1* | 6/2006 | Kim | G10L 15/22 |
| | | | | 704/270.1 |
| 2009/0292528 | A1* | 11/2009 | Kameyama | G10L 13/00 |
| | | | | 704/9 |
| 2009/0292778 | A1* | 11/2009 | Makar | G06F 16/00 |
| | | | | 709/206 |
| 2011/0213642 | A1* | 9/2011 | Makar | G06F 40/30 |
| | | | | 705/7.38 |
| 2012/0041903 | A1* | 2/2012 | Beilby | H04L 51/02 |
| | | | | 706/11 |
| 2013/0159003 | A1* | 6/2013 | Kim | G10L 15/1822 |
| | | | | 704/275 |
| 2014/0122407 | A1* | 5/2014 | Duan | G06N 5/02 |
| | | | | 706/50 |
| 2014/0122619 | A1* | 5/2014 | Duan | G06F 40/20 |
| | | | | 709/206 |
| 2014/0250195 | A1* | 9/2014 | Capper | G06N 20/00 |
| | | | | 709/206 |
| 2017/0243107 | A1* | 8/2017 | Jolley | G06N 5/02 |
| 2018/0090137 | A1* | 3/2018 | Horling | G06F 16/9535 |
| 2018/0181558 | A1* | 6/2018 | Emery | H04M 3/4936 |
| 2019/0036849 | A1* | 1/2019 | Uppala | H04L 51/02 |
| 2019/0138648 | A1* | 5/2019 | Gupta | G06F 16/3329 |
| 2019/0166071 | A1* | 5/2019 | Lim | G06F 40/35 |

FOREIGN PATENT DOCUMENTS

| | | |
|---|---|---|
| KR | 10-2016-0116538 | 10/2016 |
| KR | 10-1731867 | 5/2017 |
| KR | 10-2017-0095491 | 8/2017 |

* cited by examiner

CHATBOT SYSTEM AND SERVICE METHOD THEREOF

CROSS REFERENCE TO RELATED APPLICATION

The present application claims priority to Korean Patent Application Number 10-2017-0159393 filed on Nov. 27, 2017, the entire contents of which are incorporated herein for all purposes by this reference.

BACKGROUND

Field

The present disclosure relates, in general, to a chatting robot (chatbot), and more particularly, to a chatbot system able to understand the intention of a conversation of a user by performing a natural language-based conversation, converse with other chatting robots, and notify a result of the conversation to the user; and to a service method thereof.

Description

In the related art, chatting robots or chatbots are generally categorized as two types, i.e. non-purpose-oriented chatbots and purpose-oriented chatbots.

Tay™, a chatbot system by Microsoft Corporation, is a typical example of a non-purpose-oriented chatbot. Such a non-purpose-oriented chatbot defines rules of generating a reply sentence in response to a user input sentence, or uses a technology for automatically generating a reply sentence in response to a user input sentence by applying a technology used in machine translation, such as recurrent neutral network technology, among deep learning technologies.

A purpose-oriented chatbot is a chatbot system allowing the user to perform a conversation with a specific purpose. For example, such a purpose-oriented chatbot may be designed by a company to promote services thereof to consumers. The purpose-oriented chatbot is widely introduced to financial companies, insurance companies, online shopping malls, and the like. In the related art, the purpose-oriented chatbot is focused, from the standpoint of a company, on the ability thereof to understand a user's sentence and provide an appropriate reply during conversation. In this regard, development of technologies for analyzing context during conversations with users, constructing individualized models, and the like, is undertaken.

BRIEF SUMMARY

In late 1990s, in response to increasing amounts of homepages of a number of companies and organizations, such as government agencies, a variety of search portal sites were introduced. In addition, increasing shopping homepages introduced meta-shopping sites. Recently, a plurality of companies, such as financial and shopping companies, have used chatbot services as a means of substituting for existing online homepages.

Accordingly, the inventors have devised a chatbot system that can converse with chatbots of other companies, taking the place of a user, in a manner similar to portals and meta-shopping sites. For example, when a user intends to buy a laptop computer, the user may have to directly ask chatbots of shopping malls and check products, recommended by the chatbots, in person. However, when there is a chatbot performing conversation in place of the user, the chatbot can ask the shopping mall chatbots to recommend laptop computers and present the user with a result recommended by the shopping mall chatbots.

Therefore, an object of the present disclosure is to provide a chatbot system and a service method thereof, the type of which differs from those of related-art chatbots. The chatbot system can understand the purpose of conversation of the user, converse with purpose-oriented chatbots of companies, taking the place of the user, to realize the purpose of the conversation of the user.

The present disclosure provides a chatbot system and method that can converse with other chatbots in place of a user. The chatbot system and method can understand the purpose of conversation of a user, select chatbots to which the purpose of the user is to be transferred, converse with the selected chatbots in place of the user, and present the user with a result of conversation undertaken.

According to an aspect of the present disclosure, provided is a chatbot system conversing with provider chatbots provided by property and service providers. The chatbot system may include a consumer chatbot that understands a purpose of conversation of a user, converses with the provider chatbots in place of the user, and provides a result of the conversation to the user.

According to another aspect of the present disclosure, provided is a chatting robot system conversing with a plurality of provider chatbots provided by a plurality of property and service providers. The chatbot system may include a consumer chatbot that understands a purpose of conversation of a user, selects one or more provider chatbots from among the a plurality of provider chatbots provided by property and service providers, converses with the selected provider chatbots in place of the user, and provides a result of the conversation to the user.

The consumer chatbot may include: a consumer chatbot input recognizing the purpose of the user based on a user input conversation and determining whether or not information, based on which the consumer chatbot converses with the provider chatbots, is satisfied; a chatbot-to-chatbot conversation part selecting provider chatbots supposed to perform conversation, based on the purpose of the user and the satisfied information recognized via the consumer chatbot input, to allow the consumer chatbot to converse with the selected provider chatbots; and a consumer chatbot output recognizing a result corresponding to the purpose of the user, from among replies of the provider chatbots, and generates a final consumer chatbot reply by summarizing the result extracted from the replies of the provider chatbots.

The consumer chatbot input may include a user purpose recognizer recognizing the purpose of the user, based on the user input conversation, and an information satisfaction determiner determining whether or not information, based on which the consumer chatbot converses with the provider chatbots, is satisfied.

The user purpose recognizer may be constructed based on learning, while the information satisfaction determiner may be constructed based on rules.

According to an exemplary embodiment, the chatbot-to-chatbot conversation part may include: an object provider chatbot recognizer selecting provider chatbots supposed to perform conversation, based on the purpose of the user and the information from the user input conversation input via the consumer chatbot input; a consumer chatbot inquiry generator generating an inquiry, for which the consumer chatbot is supposed to converse with the selected provider chatbots; a provider chatbot reply analyzer analyzing the replies received from the provider chatbots through the conversation performed; and a purpose completion determiner determining whether or not the purpose of the user has been completed by analyzing final replies from the provider chatbots.

The provider chatbot reply analyzer may include a means for analyzing whether or not each of the replies sent by the provider chatbots, in response to the inquiry from the consumer chatbot, contains additional information requested by the provider chatbot.

The provider chatbot reply analyzer may be constructed based on exception processing, while the purpose completion determiner may be constructed based on pattern determination.

According to an exemplary embodiment, the consumer chatbot output may include: a provider chatbot reply recognizer recognizing a result of replies, among the replies from the provider chatbots, corresponding to the purpose of the user; and a consumer chatbot reply generator representing the result of the replies, corresponding to the purpose of the user, to the user.

The provider chatbot reply recognizer may extract information regarding whether or not processing is completed in a case of a processing requesting inquiry and extract requested information and related information in a case of an information requesting inquiry.

According to another aspect of the present disclosure, provided is chatbot service method executed by the above-described chatbot system. The method may include: recognizing, by the consumer chatbot of the chatbot system, a purpose of a user from a user input inquiry when the inquiry is input; analyzing the user input inquiry and determining whether or not information, based on which the consumer chatbot converses with the provider chatbots, is satisfied; when the information is not satisfied, generating and sends an inquiry to the user, and when the information is satisfied, recognizing and selecting one or more object provider chatbots to converse with, based on the purpose and the information recognized from the user input inquiry; and conversing, by the consumer chatbot, with the selected provider chatbots.

The method may further include: after conversing, by the consumer chatbot, with the selected provider chatbots, recognizing a result of replies, among replies from the provider chatbots, corresponding to the purpose of the user, after completion of the conversation; summarizing the result extracted from the recognized replies from the provider chatbots and generating a consumer chatbot reply; and transferring the generate consumer chatbot reply to the user.

The step of conversing, by the consumer chatbot, with the selected provider chatbots may include: recognizing and accessing, by the consumer chatbot, an object provider chatbot to converse with, based on the purpose of the user and the information; generating and sending, by the consumer chatbot, an inquiry to the object provider chatbot to converse with the object provider chatbot; when a reply is received from the object provider chatbot in response to the inquiry, analyzing the reply from the object provider chatbot; analyzing the reply from the object provider chatbot and determining whether or not the purpose of the user is completed or whether or not there is an additional information request; and when there is the additional information request from the object provider chatbot, generating and sending, by the consumer chatbot, a reply to the additional information to the object provider chatbot, and when there is no additional information request, determining whether or not the purpose of the user is completed by the reply from the object provider chatbot.

The step of determining whether or not the purpose of the user is completed may include: when the purpose of the user is not completed, regenerating a consumer chatbot inquiry; and when the purpose of the user is completed, terminating the access to the object provider chatbot and the conversation between the consumer chatbot and the object provider chatbot.

The above and other configurations and operations of the present disclosure will be more clearly understood from the following detailed description when taken in conjunction with accompanying drawings.

In the related art, a user is allowed to directly ask respective service chatbots of companies, to only receive a result from the corresponding service chatbot. In contrast, according to the present disclosure, the consumer chatbot can simultaneously ask a plurality of service chatbots, clearly summarize and compare a result of processing and presentation of the service chatbots, and present the summarized and compared result to the user. Advantages and effects of the present disclosure will be summarized as follows:

A user can simultaneously request services from a plurality of service chatbots (e.g. a batch operation, such as address updating).

A result processed and presented by a plurality of service chatbots can be summarized together to be presented to the user (e.g. a result summarizing operation, such as balance checking.)

A result presented by respective chatbots can be compared to be presented to the user (e.g. a comparing operation, such as recommendation of a product).

DETAILED DESCRIPTION

Figure 1:
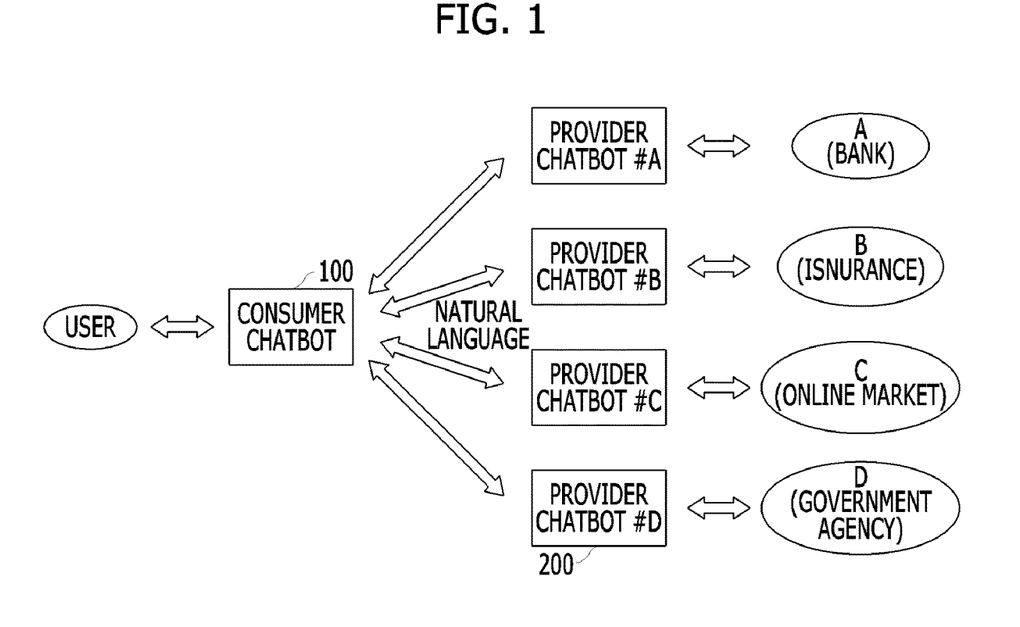
FIG. 1 is an architecture diagram illustrating the concept of, as well as terms used in, a chatbot system according to the present disclosure.

FIG. 1 is an architecture diagram illustrating the concept of, as well as terms used in, a chatbot system according to the present disclosure. Items illustrated in FIG. 1 may be defined as follows:

User: A user of the chatbot system proposed in the present disclosure. A user transfers a purpose intended to be obtained to a consumer chatting robot (chatbot) 100 (by conversation based on a natural language), and receives a result processed by the consumer chatbot 100.

Provider Chatbots (PCs) 200: Chatbots provided by a property/service provider. The provider chatbots 200 are provided by financial companies, such as banks, insurance companies, online markets, government agencies, and the like.

Consumer Chatbot (CC) 100 converses with the user, recognizes the purpose of the conversation of the user, selects suitable provider chatbots 200, and converses with the selected provider chatbots 200 in place of the user. The consumer chatbot 100 provides a result of the conversation to the user. The same chatbot service as provided to the user is provided to the consumer chatbot 100.

Figure 2:
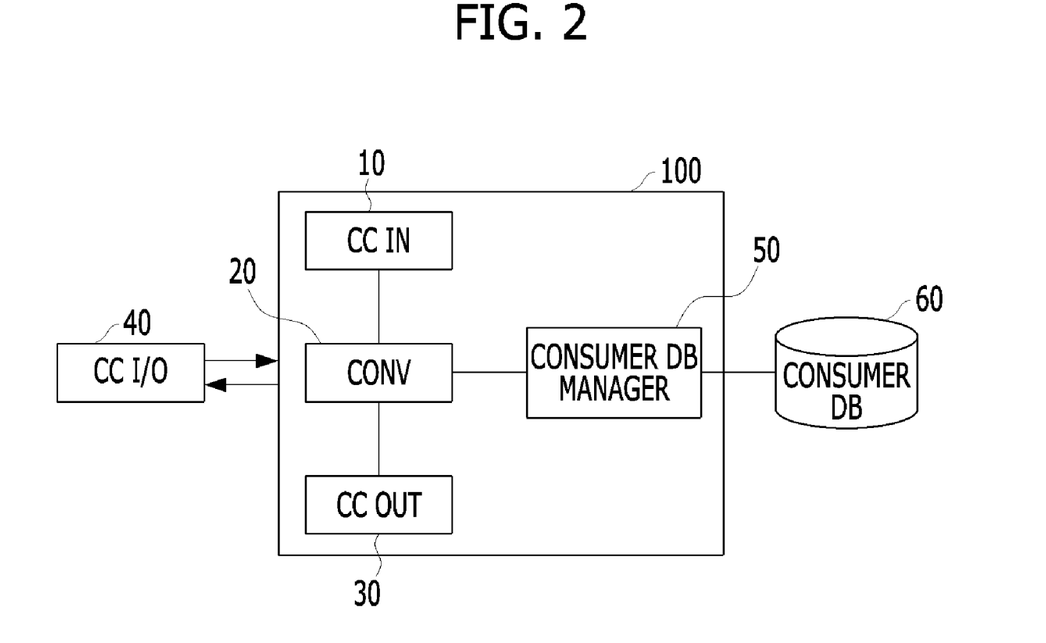
FIG. 2 is a block diagram illustrating a configuration of the consumer chatbot according to the present disclosure.

A configuration of the consumer chatbot 100 of the chatbot system proposed according to the present disclosure is illustrated in FIG. 2.

The consumer chatbot 100 receives a request from the user via a consumer chatbot input/output (CC I/O) 40, and transfers a result of response to the user. The user request may be input via a microphone, a keyboard, or the like, and the result of reply may be transferred to the user via a monitor screen or a loud speaker. The consumer chatbot input/output 40 is a type of socket. The consumer chatbot input/output 40 typically has a text-based input/output structure using a mobile chatting user interface (UI), although the consumer chatbot input/output 40 may have an input/output structure based on a web browser or an audio interface.

The consumer chatbot 100 includes a consumer chatbot input (CC IN) 10, a chatbot-to-chatbot conversation part (CONV) 20, a consumer chatbot output (CC OUT) 30, and a consumer database (DB) manager 50.

The consumer chatbot input 10 recognizes the purpose of the user, based on a user input conversation input via the consumer chatbot input/output 40, and determines whether or not information, based on which the consumer chatbot converses with the provider chatbot, is satisfied.

The chatbot-to-chatbot conversation part 20 selects a provider chatbot to converse with, based on the user's purpose, corresponding information, and the like, recognized via the consumer chatbot input 10, so that the consumer chatbot converses with the selected provider chatbot. When a plurality of provider chatbots are selected, conversation with the provider chatbots is carried out respectively. When the user's purpose is completed, the conversation is terminated.

The consumer chatbot output 30 recognizes a result corresponding to the user's purpose from among replies of the provider chatbots, and generates a final consumer chatbot reply by summarizing the result extracted from the replies of the provider chatbots.

The consumer DB manager 50 accesses the Consumer DB 60 which stores user related information (eg., personal information) and performs operations of reading or writing the user related information therefrom or therein. The stored user information includes a list of the object provider chatbots 200 of the consumer chatbot 100, and user authentication information requested by the provider chatbots 200. The user information is encrypted so as to be stored in the DB 60.

Hereinafter, components of the consumer chatbot 100 will be described in detail.

Figure 3:
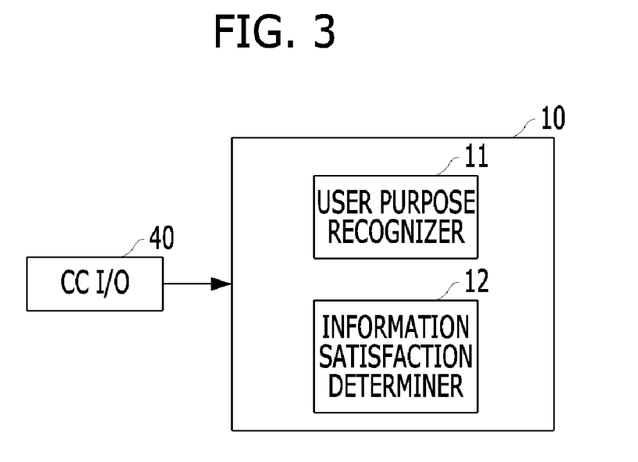
FIG. 3 is a block diagram illustrating a configuration of the consumer chatbot input.

FIG. 3 is a block diagram illustrating a configuration of the consumer chatbot input 10. The consumer chatbot input 10 includes a user purpose recognizer 11 recognizing the purpose of the user, based on a user input conversation input via the consumer chatbot input/output 40, and an information satisfaction determiner 12 determining whether or not information, based on which the consumer chatbot 100 converses with the provider chatbot 200, is satisfied.

1) User Purpose Recognizer 11

The user purpose recognizer 11 serves to recognize the purpose of the user, based on the user input conversation. The purpose of the user may be recognized using machine learning, deep learning, or the like. An example of the machine learning may be support vector machine (SVM), while an example of the deep learning may be convolutional neural network (CNN). Examples of the recognition of the user's purpose are as follows:

Example #1

(User) Update the address of the company providing the service that I subscribed to.→Update_CompanyAddress Example #2:

(User) Show how much the balance of each bank is.→Check_Balance

Example #3:

(User) Recommend a laptop computer of about ₩ 500,000 (Korean Won), with which simple document work can be carried out.→Recommend_Laptop The above illustration renders an example of "input→output" structure. The user purpose recognizer 11 can be constructed to recognize the user's purpose by performing machine learning or deep learning using thousands to millions of points of learning data, predefined as described above.

2) Information Satisfaction Determiner 12

It is determined whether or not information, based on which the consumer chatbot converses with the provider chatbot, is satisfied according to the purpose of the user. The user's purpose may vary depending on the service that the user desires. This purpose is a factor to be predefined when the chatbot system according to the present disclosure is constructed. In addition, the design of the information satisfaction determiner and the processing thereof may be realized based on the concept of "rules." For example, the design or the processing can be realized based on the rule that, "when the purpose of the user is to 'update,' the information is satisfied by the presence of 'company address values.'" If a company address to be updated (changed) in Example #1 above is not sufficiently provided, the consumer chatbot may output an additional message as follows:

Example #1

(Consumer chatbot) Please input a company address to be changed.

(User) ETRI, 218 Gajeong-ro, Yuseong-gu, Daejeon, 34129, Republic of Korea

Figure 4:
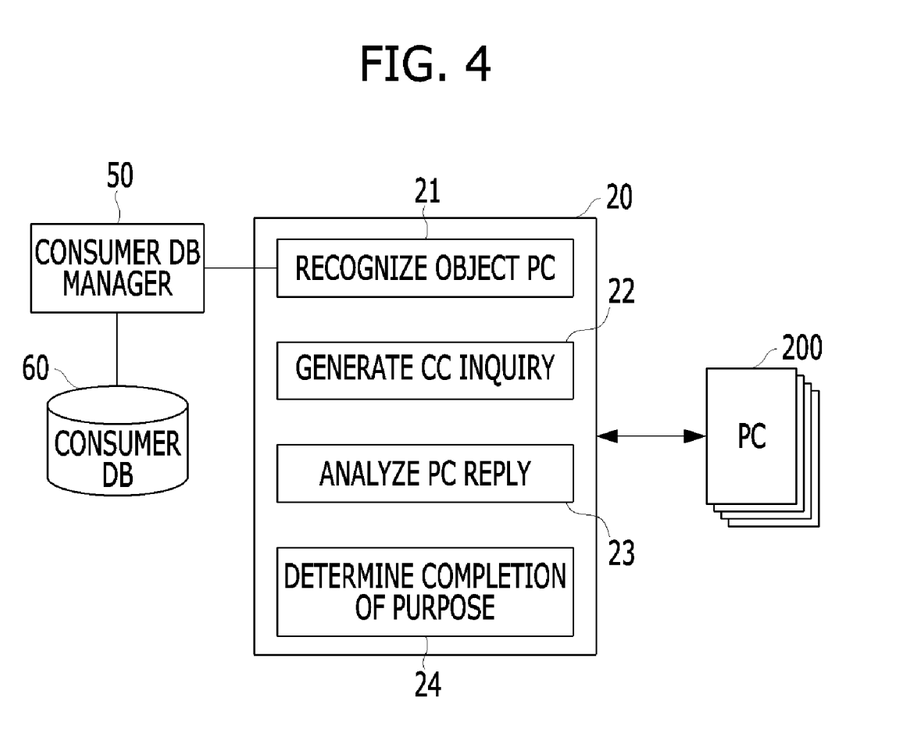
FIG. 4 is a block diagram illustrating a configuration of the chatbot-to-chatbot conversation part.

FIG. 4 is a block diagram illustrating a configuration of the chatbot-to-chatbot conversation part 20. The chatbot-to-chatbot conversation part 20 includes an object provider chatbot (PC) recognizer 21, a consumer chatbot inquiry generator 22, a provider chatbot reply analyzer 23, and a purpose completion determiner 24. The object PC recognizer 21 selects a provider chatbot supposed to perform conversation, based on the user's purpose and the information recognized via the consumer chatbot input 10. The consumer chatbot inquiry generator 22 generates an inquiry, for which the consumer chatbot is supposed to converse with the selected provider chatbot. The provider chatbot reply analyzer 23 analyzes a reply received from the provider chatbot through the conversation performed. The purpose completion determiner 24 determines whether or not the user's purpose has been completed, by analyzing the final reply of the provider chatbot. Basic conversation means between the consumer chatbot 100 and the provider chatbots 200 are also included. Such conversation means between the chatbots are known in the art. For example, "Talktalk" in Naver portal and "Talk Plus Friends" in Kakao social media service, developed in the Republic of Korea, may be used.

1) Object PC (Provider Chatbot) Recognizer 21

The object PC recognizer 21 recognizes an object provider chatbot, based on a user input conversation input via the consumer chatbot input/output 40. When the user designates a specific service, a provider chatbot of the designated service is recognized. When the user designates no specific service, a provider chatbot appropriate to the user's purpose is recognized. This object PC recognizer 21 works associatively with the Consumer DB manager 50 and the Consumer DB 60 as shown in FIG. 2 above. Examples of the recognition of the provider chatbot are as follows:

Example #1

(User) Update the address of the company providing the service that I subscribed to.→ALL (XX Bank, XX Fire Insurance, XX Shopping Mall, XX Card, . . . )

Example #2:

(User) Show how much the balance of each bank is.→Bank (XX Bank, YY Bank, ZZ Bank)

Example #3

(User) Recommend a laptop computer of about ₩ 500,000, with which simple document works can be carried out.→Shopping Mall (XX Shopping Mall, YY Shopping Mall, ZZ Market, WW Shopping Mall, . . . )

2) Consumer Chatbot Inquiry Generator 22

The consumer chatbot inquiry generator 22 serves to generate an inquiry that the consumer chatbot 100 is supposed to ask the provider chatbot 200. The consumer chatbot inquiry generator 22 generates the consumer chatbot inquiry, based on the user's purpose and the information recognized via the consumer chatbot input 10. This inquiry is transferred to the provider chatbot 200.

Example #1:

(User) Update my company address to "ETRI, 218 Gajeong-ro, Yuseong-gu, Daejeon, 34129, Republic of Korea."

Example #2

Show how much the balance of my account is.

Example #3:

Recommend a laptop computer of about ₩ 500,000, with which simple document works can be carried out.

3) Provider Chatbot Reply Analyzer 23

The provider chatbot reply analyzer 23 analyzes whether or not a reply sent by each of the provider chatbots 200, in response to the inquiry from the consumer chatbot 100, contains additional information requested by the provider chatbot 200. When the provider chatbot 200 has requested additional information, the chatbot-to-chatbot conversation part 20 of the consumer chatbot 100 generates a reply to the request for additional information by itself and provides the reply to the provider chatbot 200. When it is difficult for the chatbot-to-chatbot conversation part 20 to provide the reply by itself, the chatbot-to-chatbot conversation part 20 requests that the user provide the additional information. The design of the provider chatbot reply analyzer 23 and the design of the processing thereof may be realized based on so-called "exception processing." Examples of the additional information and reply as in Example #3 above are as follows:

Example #3

(From Provider Chatbot to Consumer Chatbot) How much weight is acceptable?

(From Consumer Chatbot to User) [Additional information request from YY Shopping Malls Chatbot] How much weight is acceptable?

(From User to Consumer Chatbot) Less than 2 kg if possible.

(From Consumer Chatbot to Provider Chatbot) Less than 2 kg if possible.

4) Purpose Completion Determiner 24

The purpose completion determiner 24 determines whether or not the purpose of conversation of the user has been completed in the final reply of the provider chatbot 200. When the purpose has not been completed in the conversation, the consumer chatbot 100 re-asks the provider chatbot 200 by generating a different expression of the same inquiry. The design of the determination processing may be realized using pattern determining technique.

As an example of determination of whether or not the purpose is completed, when the updating of the company address in Example #1 above is not completed, a different expression of the same inquiry is re-generated and re-requested to the provider chatbot. This process continues until the address changing (updating) is completed when checked.

Example #1:

(Provider Chatbot) Address update is not completed.

(Consumer Chatbot) Change company address.

(Provider Chatbot) What is new address?

(Consumer Chatbot) ETRI, 218 Gajeong-ro, Yuseong-gu, Daejeon, 34129, Republic of Korea.

(Provider Chatbot) Address update is completed.

Figure 5:
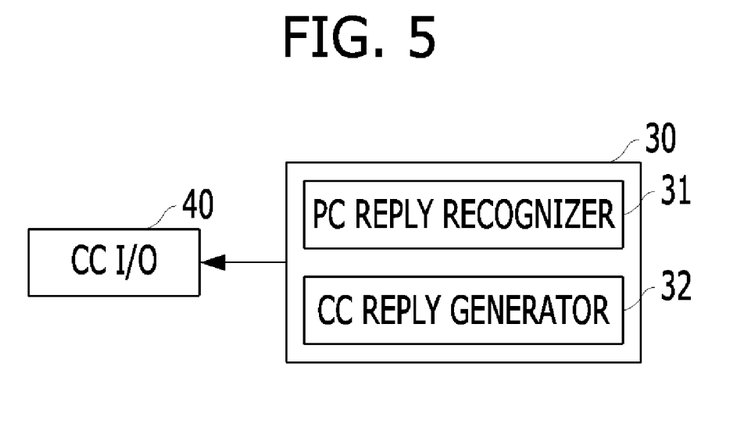
FIG. 5 is a block diagram illustrating a configuration of the consumer chatbot output.

FIG. 5 is a block diagram illustrating a configuration of the consumer chatbot output 30. The consumer chatbot output 30 includes a provider chatbot reply recognizer 31 recognizing and extracting a result of replies, among replies of the plurality of provider chatbots 200, corresponding to the user's purpose, and a consumer chatbot reply generator 32 summarizing a reply result appropriate to the user's purpose, from the result corresponding to the user's purpose, and representing the summarized result to the user.

1) Provider Chatbot Reply Recognizer 31

The provider chatbot reply recognizer 31 recognizes and extracts a result appropriate to the user's purpose from among replies of the provider chatbots. In the case of a processing requesting inquiry, information regarding whether or not processing is completed is extracted. Alternatively, in the case of an information-requesting inquiry, requested information and related information is extracted.

Example #1

(Provider Chatbot) Update is completed: "Completion" is recognized. Or, update is not completed: "Non-completion" is recognized.

Example #2

(Provider Chatbot) Your account and balance information is as follows: 000-00-0000-0: ₩ 1,000,000→Account: 000-00-0000-0; Balance. ₩ 1,000,000

Example #3:

(Provider Chatbot) X Electronics laptop model NNxxxxx-OOOO is recommended. This product is first in sales among laptop computers of about ₩ 500,000. The lowest price available is ₩ 579,000.→XX Electronics laptop model NNxxxxx-OOOO is lowest in price among laptop computers about ₩ 500,000.

2) Consumer Chatbot Reply Generator 32

The consumer chatbot reply generator 32 generates a consumer chatbot reply result by summarizing a reply result appropriate to the user's purpose, using a result of replies extracted from a plurality of provider chatbots 200, in order to represent (or reply) the consumer chatbot reply result to the user via the consumer chatbot input/output 40. Examples of an appropriate reply result are as follows:

Example #1:

Respective service chatbots were asked to update company addresses, and a processing result is as follows:

Completed. 6 (XX Bank, XX Fire Insurance, XX Shopping Mall, . . . )

Non-completed: 3 (XX Card, . . . )

Remarks. Please click on the name of each company to see the conversation history between chatbots.

Example #2

A request for balance was sent to bank chatbots, and a processing result is as follows. (Please click on the name of each company to see the conversation history between chatbots)

XX Bank 000-00-0000-0: ₩ 1,000,000
YY Bank 111-11-1111-1: ₩ 2,000,000
ZZ Bank 222-22-2222-2: ₩ 3,000,000
WW Bank 333-33-3333-3: ₩ 4,000,000

Example #3

A request for recommendation of a laptop computer was sent to shopping chatbots, and a processing result is as follows. (Please click on reasons for recommendation to see reasons for which provider chatbots recommended each laptop computer)

XX Electronics laptop model NNxxxxx-OOOO (Reason for recommendation)

Lowest price ₩ 579,000; Recommended websites: XX Shopping Mall, YY Market, and ZZ Shopping YY Electronics laptop PCooo-11xx (Reason for recommendation)

Lowest price ₩ 418,000; Recommended websites: ZZ Shopping and WW Market

Other recommended models

XX Electronics laptop NN-OO-OO-X, ₩ 600,000; QQ Mall (Reason for recommendation)

ZZ Company laptop KK-OXOX, ₩ 660,000; YY Market (Reason for recommendation)

Figure 6:
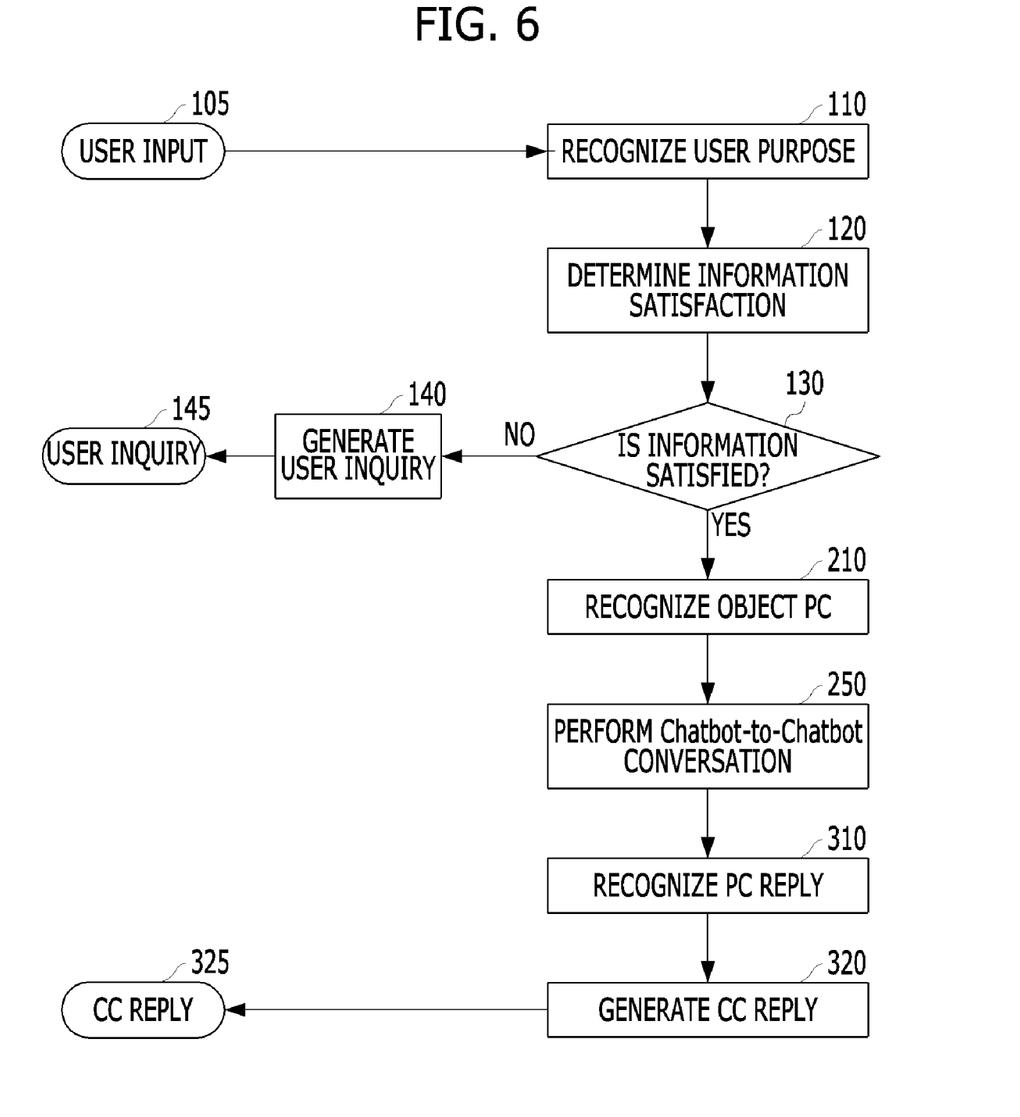
FIG. 6 is a flowchart illustrating a chatbot service method according to the present disclosure.

FIG. 6 is a flowchart illustrating a chatbot service method according to the present disclosure. Entities of a user, a consumer chatbot (CC), and provider chatbots (PCs) are the same as those defined above with reference to FIG. 1.

In step 105, the user inputs an inquiry having his/her purpose. In step 110, the consumer chatbot recognizes the purpose of the user from the user input inquiry (i.e. the inquiry input by the user).

In step 120, the consumer chatbot analyzes the user input inquiry and determines whether or not information, based on which the consumer chatbot converses with the provider chatbots, is satisfied.

If the information is not satisfied, the consumer chatbot generates an inquiry to be presented to the user in step 140, and sends the inquiry to the user in step 145. If the information is satisfied, in step 210, the consumer chatbot recognizes and selects one or more object provider chatbots to converse with, based on the purpose and the information recognized from the user input inquiry.

Then, in step 250, the consumer chatbot converses with the selected provider chatbots. When a plurality of provider chatbots are selected, the consumer chatbot respectively converses with the plurality of chatbots. When the purpose of the user is completed, the conversation is terminated.

When the conversation is completed, in step 310, the consumer chatbot recognizes a result corresponding to the user's purpose, from among replies of the provider chatbots.

In step 320, the consumer chatbot recognizes replies of one or more provider chatbots, summarizes a result extracted from the replies, and generates a consumer chatbot reply to be finally transferred to the user.

In step 325, the consumer chatbot transfers the consumer chatbot reply to the user.

Figure 7:
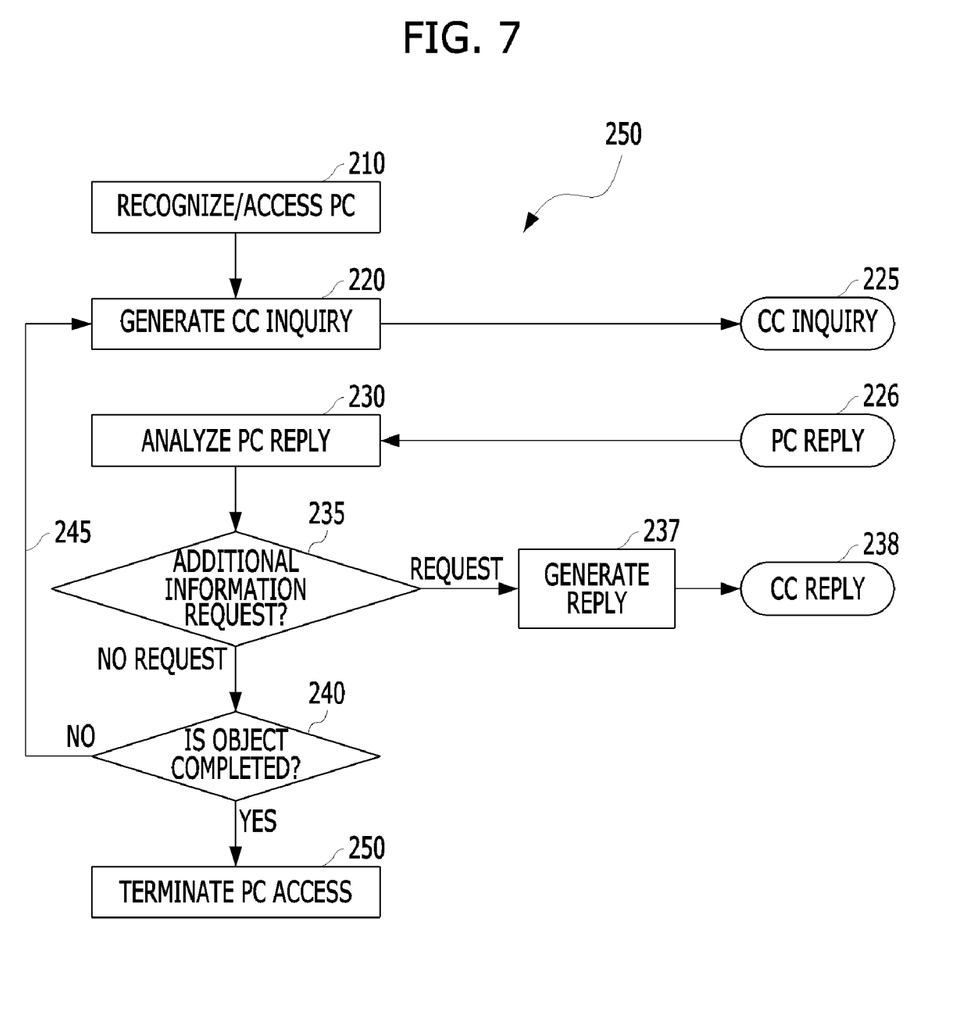
FIG. 7 is a flowchart illustrating a specific process of step 250 in FIG. 6.

FIG. 7 is a flowchart illustrating a specific process of step 250 (i.e. the conversation between the consumer chatbot and the selected provider chatbots) in FIG. 6.

In step 210, the consumer chatbot recognizes an object provider chatbot to converse with, based on the user's purpose and the information, and accesses the recognized object provider chatbot.

The consumer chatbot generates an inquiry, for which the consumer chatbot is supposed to converse with the selected provider chatbot, in step 220, and sends the inquiry to the corresponding provider chatbot in 225.

When a reply is received from the provider chatbot due to the conversation in step 226, the consumer chatbot analyzes the reply of the provider chatbot in step 230.

Due to the analysis of the final reply of the provider chatbot in step 230, the consumer chatbot determines whether or not the user's purpose is completed or whether or not there is an additional information request in step 235.

When the provider chatbot 200 requests additional information, the consumer chatbot generates a reply to the additional information request in step 237 and provides the reply to the provider chatbot in step 238.

When there is no additional information request, the consumer chatbot determines whether or not the purpose is completed by the reply of the provider chatbot in step 240.

When the purpose is not completed, in step 245, step 220 is repeated to generate a consumer chatbot inquiry, and the subsequent steps are repeated. When the purpose is completed, the access to the provider chatbot is terminated. The conversation between the consumer chatbot and the provider chatbot is terminated in step 250.

Figure 8:
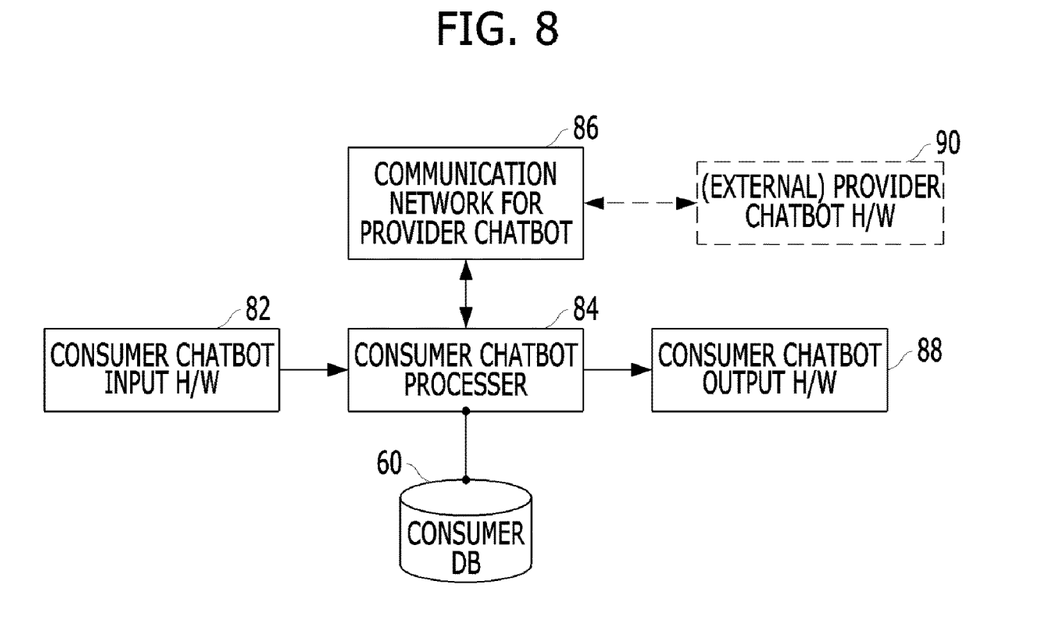
FIG. 8 shows one exemplary embodiment of hardware configuration of a chatbot system according to the present invention.

FIG. 8 shows one exemplary embodiment of hardware configuration of a chatbot system according to the present invention.

A Consumer Chatbot input hardware 82 is for implementing an input portion of the CC I/O of FIG. 2. This is the hardware that receives the user's request, and it may employ a microphone, keyboard, on-screen menu selection, and so on.

A Consumer Chatbot processor 84 is a processor that performs the operations of the consumer chatbot system of the present invention, such as processing Consumer Chatbot's input and output, performing the above-described execution of Chatbot-to-Chatbot conversation, etc.

A communication network hardware for Provider Chatbot 86 is a network hardware for transmitting a query to an external Provider Chatbot 90 and receiving a response. This may be an Ethernet or any other wireless data network.

A Consumer Chatbot output hardware 88 is for implementing an output portion of the CC I/O 40 of FIG. 2. That hardware 88 delivers the result from the Consumer Chatbot processor 84 to a user, and it may employ a loudspeaker, a display screen, etc.

A Consumer DB 60 is a hardware that stores user related information (e.g., personal information) as described above, and it may be e.g., a physical DISK device.

Hereinabove, the foregoing embodiments according to the present disclosure have been described for illustrative purposes, while not being limitative. It should be understood that the scope of the present disclosure shall be defined by the broadest interpretation of the appended Claims.

What is claimed is:

1. A chatbot system comprising
a consumer chatbot, executable by a processor, configured to understand a purpose of conversation of a user, converse with provider chatbots provided by property and service providers, in place of the user, and provide a result of the conversation to the user, wherein the consumer chatbot comprises:
a consumer chatbot input comprising a user purpose recognizer recognizing a purpose of the user based on a user input conversation, and an information satisfaction determiner determining before provider chatbots are selected whether or not information in said user input conversation, which the consumer chatbot uses to converse with the provider chatbots, is satisfactory according to the recognized purpose of the user;

a chatbot-to-chatbot conversation part comprising an object provider chatbot recognizer selecting provider chatbots supposed to perform conversation, based on the purpose of the user and the satisfied information recognized via the consumer chatbot input, to allow the consumer chatbot to converse with the selected provider chatbots, a consumer chatbot inquiry generator generating an inquiry, for which the consumer chatbot is supposed to converse with the selected provider chatbots, a provider chatbot reply analyzer analyzing replies received from the provider chatbots through the conversation performed, and a purpose completion determiner determining whether or not the purpose of the user has been completed by analyzing final replies of the provider chatbots; and a consumer chatbot output recognizing a result corresponding to the purpose of the user, from among replies of the provider chatbots, and generates a final consumer chatbot reply.

2. The chatbot system according to claim 1, wherein the provider chatbot reply analyzer comprises an analyzer for analyzing whether or not each of the replies sent by the provider chatbots, in response to the inquiry from the consumer chatbot, contains additional information requested by the provider chatbot.

3. The chatbot system according to claim 1, wherein the consumer chatbot output comprises:
a provider chatbot reply recognizer recognizing a result of replies, among the replies of the provider chatbots, corresponding to the purpose of the user; and
a consumer chatbot reply generator representing the result of the replies, corresponding to the purpose of the user, to the user.

4. The chatbot system according to claim 3, wherein the provider chatbot reply recognizer extracts information regarding whether or not processing is completed in a case of a processing requesting inquiry and extracts requested information and related information in a case of an information-requesting inquiry.

5. A chatting robot system comprising
a consumer chatbot, executable by a processor, configured to understand a purpose of conversation of a user, select one or more provider chatbots from among a plurality of provider chatbots provided by a plurality of property and service providers, converse with the selected provider chatbots in place of the user, and provide a result of the conversation to the user, wherein the consumer chatbot comprises:
a consumer chatbot input comprising a user purpose recognizer recognizing a purpose of the user based on a user input conversation, and an information satisfaction determiner determining before provider chatbots are selected whether or not information in said user input conversation, which the consumer chatbot uses to converse with the provider chatbots, is satisfactory according to the recognized purpose of the user;

a chatbot-to-chatbot conversation part comprising an object provider chatbot recognizer selecting provider chatbots supposed to perform conversation, based on the purpose of the user and the satisfied information recognized via the consumer chatbot input, to allow the consumer chatbot to converse with the selected provider chatbots, a consumer chatbot inquiry generator generating an inquiry, for which the consumer chatbot is supposed to converse with the selected provider chatbots, a provider chatbot reply analyzer analyzing replies received from the provider chatbots through the conversation performed, and a purpose completion determiner determining whether or not the purpose of the user has been completed by analyzing final replies of the provider chatbots; and a consumer chatbot output recognizing a result corresponding to the purpose of the user, from among replies of the provider chatbots, and generates a final consumer chatbot reply.

6. The chatting robot system according to claim 5, wherein the provider chatbot reply analyzer comprises an analyzer for analyzing whether or not each of the replies sent by the provider chatbots, in response to the inquiry from the consumer chatbot, contains additional information requested by the provider chatbot.

7. The chatting robot system according to claim 5, wherein the consumer chatbot output comprises:
a provider chatbot reply recognizer recognizing a result of replies, among the replies of the provider chatbots, corresponding to the purpose of the user; and
a consumer chatbot reply generator representing the result of the replies, corresponding to the purpose of the user, to the user.

8. The chatting robot system according to claim 7, wherein the provider chatbot reply recognizer extracts information regarding whether or not processing is completed in a case of a processing requesting inquiry and extracts requested information and related information in a case of an information-requesting inquiry.

9. A chatbot service method comprising:
recognizing, by a consumer chatbot of a chatbot system, a purpose of a user from a user input inquiry when the inquiry is input;
analyzing the user input inquiry and determining before provider chatbots are selected whether or not information in said user input inquiry, which the consumer chatbot uses to converse with provider chatbots provided by property and service providers, is satisfactory according to the recognized purpose of the user;
when the information is not satisfactory, generating and sending an inquiry to the user before provider chatbots are selected, and when the information is satisfactory, recognizing and selecting one or more object provider chatbots to converse with, based on the purpose and the information recognized from the user input inquiry;
conversing, by the consumer chatbot, with the selected provider chatbots;
recognizing a result of replies, among replies of the provider chatbots, corresponding to the purpose of the user, after completion of the conversation;
summarizing the result extracted from the recognized replies of the provider chatbots and generating a consumer chatbot reply; and
transferring the generate consumer chatbot reply to the user.

10. The method according to claim 9, wherein conversing, by the consumer chatbot, with the selected provider chatbots comprises:
- recognizing and accessing, by the consumer chatbot, an object provider chatbot to converse with, based on the purpose of the user and the information;
- generating and sending, by the consumer chatbot, an inquiry to the object provider chatbot to converse with the object provider chatbot;
- when a reply is received from the object provider chatbot in response to the inquiry, analyzing the reply of the object provider chatbot;
- analyzing the reply of the object provider chatbot and determining whether or not the purpose of the user is completed or whether or not there is an additional information request; and
- when there is the additional information request from the object provider chatbot, generating and sending, by the consumer chatbot, a reply to the additional information to the object provider chatbot, and when there is no additional information request, determining whether or not the purpose of the user is completed by the reply of the object provider chatbot.

11. The method according to claim 10, wherein determining whether or not the purpose of the user is completed comprises:
- when the purpose of the user is not completed, regenerating a consumer chatbot inquiry; and
- when the purpose of the user is completed, terminating the access to the object provider chatbot and the conversation between the consumer chatbot and the object provider chatbot.

* * * * *